No. 779,994. PATENTED JAN. 10, 1905.
J. DOWNING.
CUTTING APPARATUS FOR MOWERS, REAPERS, &c.
APPLICATION FILED MAR. 22, 1904.

2 SHEETS—SHEET 2.

WITNESSES:
INVENTOR
Jacob Downing
By
Alexander & Dowell
Attorneys

No. 779,994. Patented January 10, 1905.

UNITED STATES PATENT OFFICE.

JACOB DOWNING, OF DENVER, COLORADO.

CUTTING APPARATUS FOR MOWERS, REAPERS, &c.

SPECIFICATION forming part of Letters Patent No. 779,994, dated January 10, 1905.

Application filed March 22, 1904. Serial No. 199,404.

*To all whom it may concern:*

Be it known that I, JACOB DOWNING, of Denver, in the county of Denver and State of Colorado, have invented certain new and useful Improvements in Cutting Apparatus for Mowers, Reapers, &c.; and I hereby declare that the following is a full, clear, and exact description thereof, reference being had to the accompanying drawings, which form part of this specification.

This invention is an improvement in the cutting apparatus of mowers, headers, reapers, and like machines for harvesting alfalfa-grass, grain, &c.

The invention is particularly designed for use in connection with the machine shown in my Patent No. 740,633, of October 6, 1903, in place of the endless band cutting apparatus shown in said patent; and the object of the invention is to provide a more compact cutting apparatus and to carry the cut material out of the way of the machine and lay it in windrows at one side thereof; and to this end the invention consists in the novel construction and combination of the endless cutter and conveyers, their connections, and driving mechanisms, as will be hereinafter set forth in the claims, and more particularly stated in the following description, referring to the accompanying drawings, in which—

Figure 1:
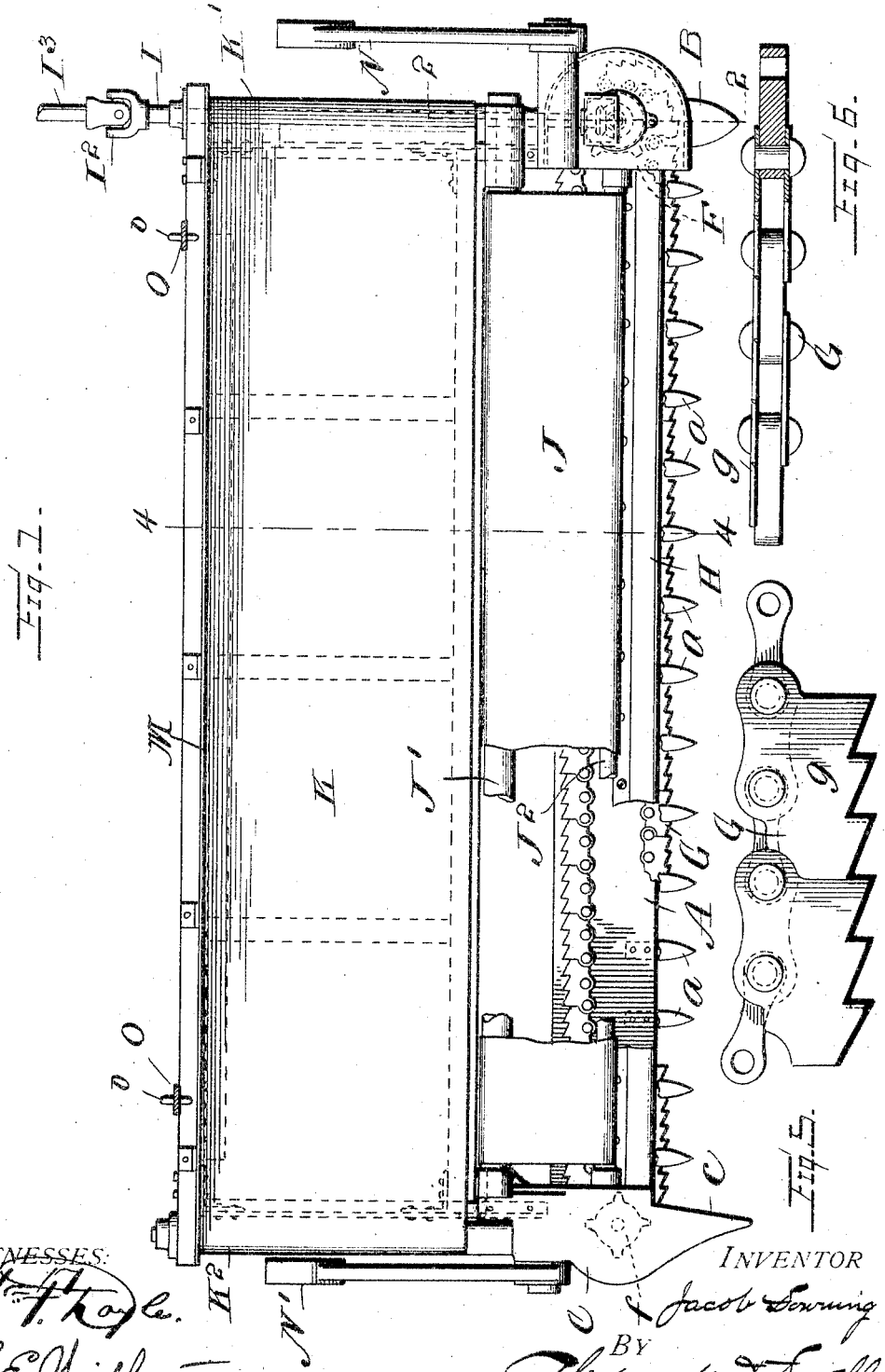
Figure 2:
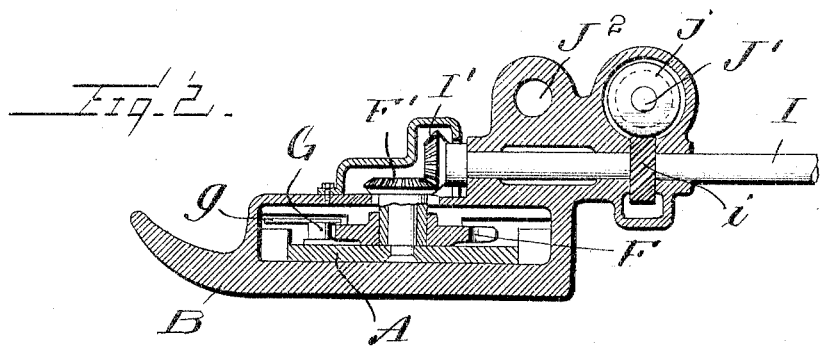
Figure 3:
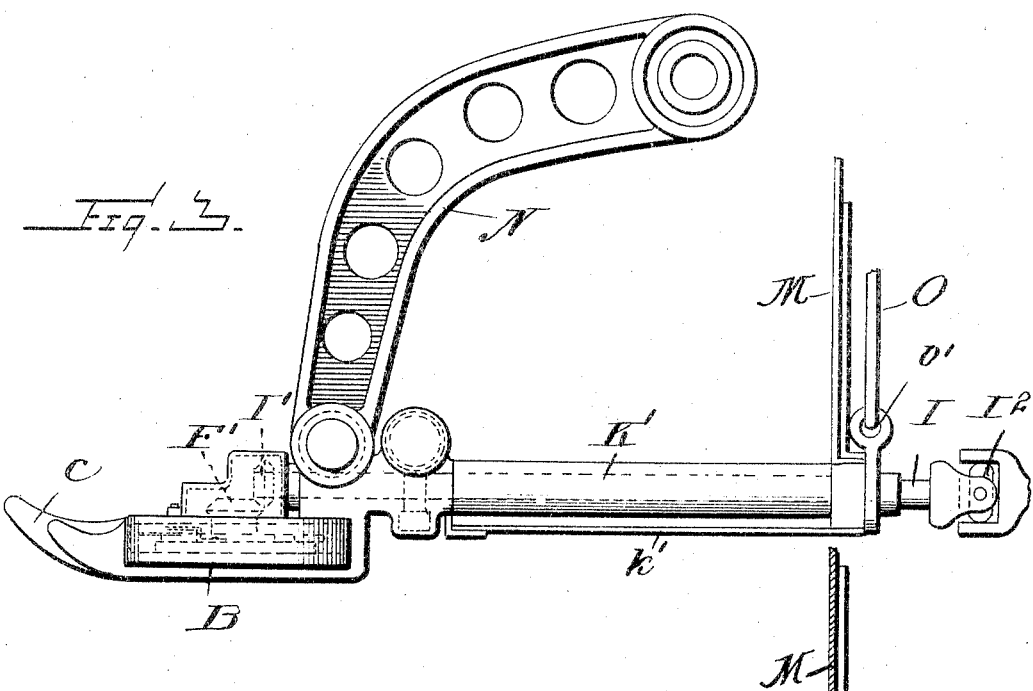
Figure 4:
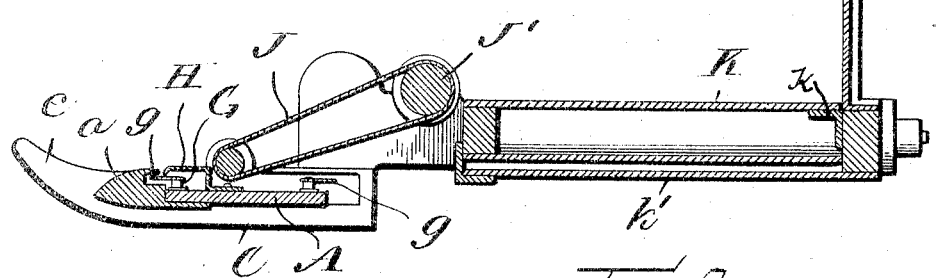

Figure 1 is a top plan view, partly broken, of the complete cutting apparatus. Fig. 2 is an enlarged detail section on line 2 2, Fig. 1. Fig. 3 is an enlarged end view of Fig. 1. Fig. 4 is an enlarged section on line 4 4, Fig. 1. Figs. 5 and 6 are detail views of the chain cutter.

The cutter guide-bar A is of any desired length and is provided with the usual guide-fingers $a$ on its front edge, and to its opposite ends are attached the hollow shoe-castings B and C, the latter having a forwardly-projecting finger $c$, adapted to serve as a guide or parter for the grain in advance of the cutter. In the shoe C is journaled a small sprocket $f$, and in the shoe B is journaled a larger sprocket F, and between and around said sprockets runs the endless chain cutter G, composed of a sprocket-chain to the upper links of which are attached the cutter-blades $g$, as in Figs. 5 and 6. Each of these blades is secured by two rivets of the chain, so as to have a firm and steady motion along the guide-fingers during the cutting operation, and they are preferably formed with a plurality of teeth or cutting edges, as shown.

The front run of the chain cutter is protected by a guard H, which extends thereover close to the fingers and prevents grass, stubble, &c., clogging the chain.

The sprocket-gear F is provided with a bevel-gear F', meshing with a bevel-pinion I' on the inner end of a driven shaft I, journaled in the shoe-casting B above sprocket F and extending rearwardly to the rear end of the cutting-frame, where it is connected by a universal joint $I^2$ with a shaft $I^3$, which is connected to the driving power (not shown) and by which the endless chain cutter is driven during the operation of the machine.

The shoe-castings B and C also form the front corners of the carrying-belt frame, and between said shoes B C and above the cutter A is an endless carrying-belt J, which runs over rollers J' $J^2$, journaled in suitable bearings in the shoe-castings B C, as shown, above the cutter, but so close thereto that the grain cut thereby will fall upon carrier J and be moved backward and discharged upon a second carrier-belt K, running at right angles to carrier J. The carrier-belt J is driven in the proper direction by means of suitable gearing from shaft I. As shown, shaft J' has a worm-pinion $j$ on its end meshing with a worm-pinion $i$ on shaft I. (See Fig. 2.) A plate may be arranged under carrier J, so as to protect the latter and cover the rear run of the cutter G, if desired.

The carrier-belt K runs over rollers K' $K^2$ at the ends of the cutting-frame, respectively, in rear of the shoes B C, roller K' being, in fact, part of or mounted fast on the shaft I, so as to be driven thereby, and thus travel the endless carrier. Owing to the width of carrier K a supporting-plate $k$, of sheet metal, or other suitable device may be arranged in the frame under the upper rim of the carrier K. I also prefer to place a protecting metal plate $k'$ below the lower run of said carrier. The upper plate prevents the carrier sagging under the weight of the grain, and the lower plate prevents its injury by obstacles over which the cutting apparatus passes.

I propose to incase the operative parts as far as necessary or desirable to protect them from dirt and choking; but this casing is an incidental and not a substantive feature of the apparatus. Along the rear edge of the carrier K is arranged an upstanding guide-plate M, which prevents the grain passing backward off the carrier K and keeps it in good alinement thereon.

The shoes B C are shown as pivoted to the lower ends of arms N, which can be attached to a common supporting-shaft, (not shown,) by rocking which the entire cutting apparatus can be raised and lowered. The cutting apparatus can be tilted on these arms N or set at different inclinations by means of the links O, attached to the rear end of the apparatus, as indicated in Fig. 3, and to a suitable controlling-lever on the main frame. (Not shown.) The features and means for suspending and tilting the apparatus are commonly understood and need no further explanation or illustration.

In operation the cutting apparatus as a whole is advanced broadside through the grass or alfalfa, so that the front run of the endless cutter cuts a wide swath therethrough. The cut grass topples over onto the carrier J, by which it is carried backward and dumped onto the carrier K, the latter being preferably arranged below the plane of the carrier J to facilitate the discharge of grass from the latter onto the former. Carrier K conveys the grass to one side of the machine and dumps it in windrows. The machine can be used to turn the grass over when partly dried by removing the cutter and running the machine along the windrow.

Having thus described my invention, what I therefore claim as new, and desire to secure by Letters Patent thereon, is—

1. In a cutting apparatus, the combination of a frame, an endless chain cutter disposed at the front side of the frame, an endless carrier above said cutter and running at right angles to the main run of the cutter, and a secondary carrier in rear of the first carrier and running at right angles thereto; with a shaft and gearing for driving said cutter, gearing for driving the first carrier from said shaft, and a drum on said shaft over which the second carrier runs, substantially as described.

2. In a cutting apparatus, the combination of a front finger-bar, the shoe-castings at opposite ends of said bar, sprockets respectively journaled in said castings, an endless sprocket-chain running around and between said sprockets, the cutters attached to said chain, a driven shaft extending at right angles to said chain, and gearing between said shaft and one of the chain-sprockets; with an endless carrier above the cutter, and a second endless carrier in rear of the first carrier and running at right angles thereto, substantially as described.

3. In a cutting apparatus, the combination of the frame, a cutter thereon, a pair of parallel rollers above the cutter, an endless carrier running thereover, a pair of rollers disposed at the ends of said frame, and at right angles to the first rollers, an endless carrier running over the latter rollers, at right angles to the first carrier, a driven shaft directly operating the second apron, gearing for operating the first apron and one of the chain-sprockets from said shaft, and an upstanding guide-plate in rear of the second carrier, all substantially as and for the purpose described.

4. In a cutting apparatus, the combination of a front finger-bar, the shoe-castings at opposite ends of said bar, sprockets journaled in said castings, an endless sprocket-chain running around and between said sprockets, the cutters attached to said chain, the cutter guard-plate, a driven shaft arranged at right angles to the chain, and gearing between said shaft and one of the chain-sprockets; with an endless carrier above the cutter, a second endless carrier in rear of the first carrier and running at right angles thereto, and means for driving the second carrier from said shaft, substantially as described.

5. In a cutting apparatus, the combination of a frame, an endless chain cutter, a driven shaft, and gearing for operating said cutter, a pair of parallel rollers, one of said rollers arranged above and the other above and in rear of the cutter, an endless carrier running over said rollers, a pair of rollers disposed at opposite ends of said frame at right angles to the first carrier, an endless carrier running over the latter rollers, gearing in said frame for operating both endless carriers from said driven shaft, and an upstanding guide-plate in rear of the second carrier, all substantially as and for the purpose described.

6. In a grain-cutting apparatus, the combination of the frame having a front finger-bar, shoe-castings at the opposite ends of said bar, sprockets journaled in said castings on vertical axes, an endless cutter in said frame running between said sprockets, a driven shaft at right angles to the cutter, and gearing for driving one of said sprockets therefrom; with an endless carrier above the cutter, gearing between said carrier and the driven shaft, a second endless carrier running at right angles to the first carrier, means for driving the second carrier from said shaft, and an upstanding guide-plate in rear of the second carrier, all substantially as and for the purpose described.

In testimony that I claim the foregoing as my own I affix my signature in presence of two witnesses.

JACOB DOWNING.

In presence of—
  LEWIS B. FRANCE,
  RALPH E. STEVENS